May 17, 1938.  W. BLUME  2,117,786
TAIL SKID FOR AIRPLANES
Filed Dec. 6, 1937
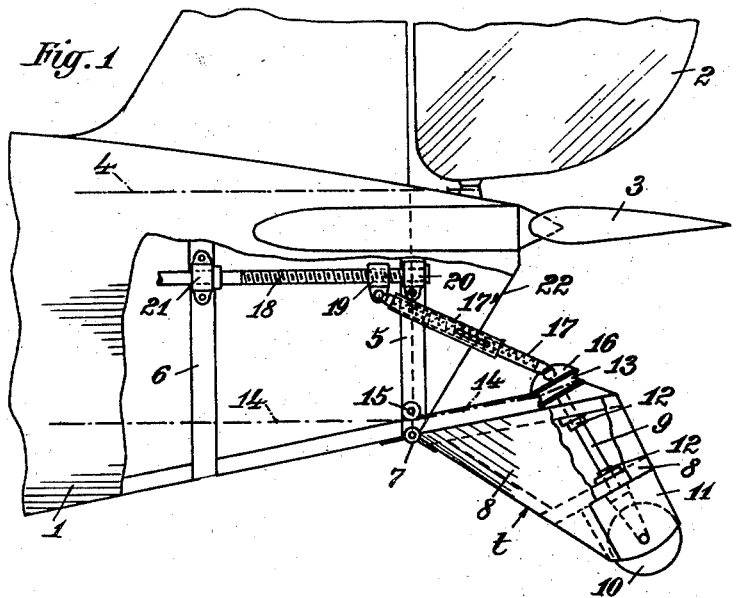
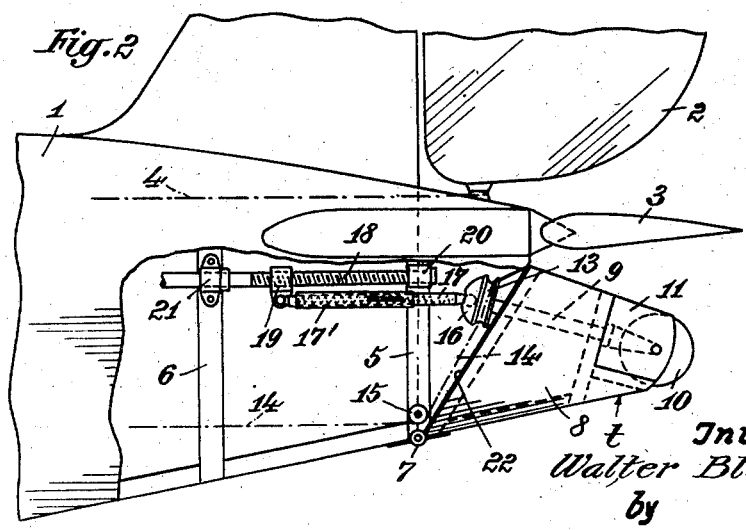
Inventor:
Walter Blume,
by
Bailey & Carson
Attorneys Patented May 17, 1938

2,117,786

UNITED STATES PATENT OFFICE 2,117,786

TAIL SKID FOR AIRPLANES

Walter Blume, Brandenburg (Havel), Germany, assignor of one-half to the firm Arado Flugzeugwerke G. m. b. H., Brandenberg, Germany, a German company Application December 6, 1937, Serial No. 178,378
In Germany January 14, 1936

3 Claims. (Cl. 244—109)

My invention relates to airplanes, and more particularly to tail skids equipped with a steering wheel.

It is an object of my invention to provide an improved tail skid of this type.

To this end, in combination with a fuselage and a cover on the fuselage, I provide a horizontal hinge by which a tail skid is connected to the trailing end of the fuselage, means such as a threaded spindle and a nut on the spindle, for turning the skid about its hinge, spring means, preferably of the telescope type, interposed between the skid and the means for turning it, a steering wheel mounted to rotate on the skid, means for turning the steering wheel, and a cover on the skid which is flush with the cover on the fuselage when the skid has been turned into its elevated position about the hinge.

Steerable tail skids have already been proposed in a type of airplane known by the fancy name of the "amphibium" in which a steering wheel is advanced and retracted by pneumatic means but such skids are without covers so that they do not make up a streamlined trailing end of the fuselage when in elevated position and this is objectionable from the aerodynamic point of view since eddies form at this point.

It has also been proposed to provide tail skids with spring means which are housed in the rudder when in retracted position, and are advanced and retracted by mechanism comprising a threaded spindle and a nut, as mentioned above. Such tail skids are not equipped with covers, which involves the aforesaid drawbacks, and, besides, they increase the weight of the rudder which is not desirable with respect to stabilization.

Retractable skids equipped with a runner instead of a steering wheel are also known and have been equipped with a streamlined cover. Skids of this type have the drawback that the runner projects from the fuselage in the retracted position of the skid and increases the aerodynamic resistance.

In the accompanying drawing the trailing end of an airplane fuselage equipped with my novel skid is illustrated by way of example.

In the drawing

Fig. 1 is an elevation of the trailing end, with the tail skid lowered, and

Fig. 2 is an elevation of the trailing end, with the tail skid elevated.

Referring now to the drawing, 1 is the trailing end of the fuselage of a plane which is sloped at 22, with a fin and a rudder 2, and a rudder control 4 shown in dot-and-dash lines. The fin and the rudder are broken away at their upper ends. 5 is the last bulkhead whose base coincides with the lower end of the slope 22, and 6 is the next adjacent intermediate bulkhead.

7 is a horizontal hinge at the base of the last bulkhead 5, and $t$ is the tail skid which is pivotally connected to the bulkhead by the hinge. The tail skid is equipped with a suitable frame shown in dotted lines, and with a cover 8 which in the elevated position of the tail skid, Fig. 2, is flush with the cover of the trailing fuselage end 1.

Mounted to turn in the frame of the tail skid $t$ is a shaft 9 equipped with a fork at its lower end in which a steering wheel 10 is mounted to rotate. The tail skid cover 8 is recessed at its lower end for the reception of a cover portion 11 which is attached to, and turns with, the shaft 9 and extends over the major portion of the steering wheel 10.

12 is a bearing for the upper end of the shaft 9 in the tail skid frame, 13 is a pulley on that end of the shaft 9 which projects beyond the bearing 12, 14 is a cable placed on the pulley, and 15 is a guide pulley on the last bulkhead 5 over which the cable extends to the cockpit. The means for operating the rudder control 4 and the cable 14 are preferably so arranged that they can be manipulated by the pilot at the same time so that the rudder 2 and the steering wheel 10 are turned together.

The shaft 9, besides its function as the support of the steering wheel 10, acts as a strut or brace for the frame of the tail skid $t$ and as a thrust member for transmitting the load from the fuselage to the steering wheel. 16 is a ball-and-socket joint on the pulley 13, and 17 is one member of a telescoping spring buffer whose lower end is connected to the ball-and-socket joint 16 and whose upper end is inserted in the other member 17'. A spring is inserted in the two members. The upper end of the member 17' is pivotally connected to a nut 19 on a threaded portion 18 of a spindle mounted to rotate in bearings 20 and 21 of the respective bulkheads 5 and 6. Means, not shown, must obviously be provided for holding the nut 19 against rotation, and any suitable means, not shown, are provided at the cockpit for rotating the spindle.

While the plane is on the ground, any shocks caused by irregularities are absorbed by the spring buffer 17, 17', and at the same time the plane is steered by the cooperation of the steering wheel 10 and the rudder 2. When the plane is in the air, the spindle 18 is rotated by the pilot to move the nut 19 from the position in Fig. 1 into the position in Fig. 2, moving the spring buffer to the right and turning the tail skid $t$ about its hinge 7 until the upper end of the cover 8 on the tail skid bears against the sloping end 22 of the fuselage cover. At the same time, the shaft 9 is turned to move the steering wheel 10 into its neutral or central position so that its cover 11 is flush with the cover 8 of the tail skid $t$ which in turn is flush with the cover of the fuselage end 1. In this manner, a continuous streamlined body is formed as far as the lower end of the cover 11 for the steering wheel 10. This cover extends over the major portion of the steering wheel and exposes only so much of the wheel as is required for its unobstructed running on the ground.

It will be understood that the means for rocking the tail skid $t$ about the hinge 7, and the means for turning the shaft 9 on which the steering wheel 10 is mounted to rotate, interfere with each other in no way so that it is possible to turn the steering wheel 10 and the rudder 2, notwithstanding the hinged connection of the tail skid $t$ to the fuselage. At the same time, the cover 11 of the steering wheel 10 is not substantially wider than the wheel itself.

For lowering the tail skid $t$, the spindle 18 is rotated in the opposite direction to that in which the tail skid is elevated.

It is understood that I am not limited to the construction which has been shown and described by way of example. Various modifications may be made without departing from my invention.

I claim:

1. In an airplane, a fuselage, a cover on the fuselage, a tail skid, a horizontal hinge connecting the tail skid to the trailing end of the fuselage, means for turning the skid about the hinge, spring means interposed between the skid and the means, a steering wheel mounted to rotate on the skid, means for turning the steering wheel, and a cover on the skid which, in the elevated position of the skid, is flush with the cover on the fuselage.

2. In an airplane, a fuselage, a cover on the fuselage, a tail skid, a horizontal hinge connecting the tail skid to the trailing end of the fuselage, means for turning the skid about the hinge, spring means interposed between the skid and the means, a steering wheel mounted to rotate on the skid, means for turning the steering wheel, a cover on the skid which, in the elevated position of the skid, is flush with the cover on the fuselage, and a cover arranged to turn with the steering wheel and extending over the major portion of the wheel, which cover, in the central position of the wheel, is flush with the cover of the skid.

3. In an airplane, a fuselage, a cover on the fuselage, a tail skid, a frame forming part of the tail skid, a horizontal hinge connecting the frame of the tail skid to the trailing end of the fuselage, means for turning the skid about the hinge, a shaft mounted to rotate in the tail skid frame in the manner of a bracing member for the frame, spring means interposed between the skid turning means and the shaft, a steering wheel mounted to rotate on the shaft, a cover on the skid frame which, in the elevated position of the skid, is flush with the cover on the fuselage, means for turning the shaft, and a cover secured to the shaft and extending over the major portion of the wheel, which cover, in the central portion of the wheel, is flush with the cover of the skid.

WALTER BLUME.